US005194813A

United States Patent [19]

Hannah et al.

[11] Patent Number: 5,194,813

[45] Date of Patent: Mar. 16, 1993

[54] SPARK IGNITION ANALYZER

[76] Inventors: Kenneth H. Hannah, Box 48, Chelmsford, Ontario, Canada, P0M 1L0; Ronald R. Plante, 98 Hardwood St., Soo, Ontario, Canada, P6A 5W4

[21] Appl. No.: 760,544

[22] Filed: Sep. 16, 1991

[51] Int. Cl.[5] .............................. G01M 15/00

[52] U.S. Cl. .............................. 324/379; 324/399; 324/392; 73/117.3

[58] Field of Search .............................. 73/116, 117.30; 324/402, 399, 392, 391, 379, 380

[56] References Cited

U.S. PATENT DOCUMENTS 3,286,165 11/1966 Small .............................. 324/391
4,004,213 1/1977 Kato .............................. 324/399
4,006,403 2/1977 Olsen .............................. 324/399
4,008,434 2/1976 Schaefer .............................. 324/381
4,684,896 8/1987 Weishaupt .............................. 324/399
4,937,527 6/1990 Sniegowski .............................. 324/384

*Primary Examiner*—Kenneth A. Wieder
*Assistant Examiner*—Jose M. Solis
*Attorney, Agent, or Firm*—Jeffrey T. Imai; Arne I. Fors

[57] ABSTRACT

A spark ignition analyzer comprising a probe having a first and second pick-up responsive to a voltage from an ignition wire, a high tension detector for detecting an absolute voltage increase from the first pickup and triggering a first visual signal for a predetermined time period, and a spark detector for detecting a high frequency voltage fluctuation from the second pick-up and triggering a second visual signal for a predetermined time period. The combination of visual signals is used to analyze the ignition system of an engine.

12 Claims, 7 Drawing Sheets

SPARK IGNITION ANALYZER

FIELD OF THE INVENTION

This invention relates to a device for testing and diagnosing the ignition system of an internal combustion engine. In particular, this invention relates to a hand held portable ignition tester.

BACKGROUND OF THE INVENTION

Modern automobile engines have become more complex in recent years. In particular, automobile engines can have either a conventional ignition system or a non-distributor ignition system. In either case, if the engine is not operating properly it is necessary to evaluate whether the spark plugs of an engine are firing properly.

Most conventional ignition systems generate a high voltage negative pulse to the spark plug. Since electrons are negative, it is easier to repel them from the centre electrode to cause a spark. Non-distributor type designs, i.e. electronic ignition systems, use a high voltage positive pulse to cause the spark plug to fire.

When an ignition coil is pulsed, the secondary voltage will rise with respect to the polarity of the system. The spark will not disturb this rise in voltage until the spark potential has been reached. At this point, the spark plug undergoes a step change in terminal resistance suddenly presenting a low resistance path to ground. This will cause the energy in the coil secondary to discharge and rapidly collapse the voltage. The energy will jump across the gap causing a spark which ignites the fuel-air mixture. The effect of the spark is the generation of an initial high amplitude, high frequency, counter-voltage spark burst.

It is well known that electromagnetic emissions are generated by the ignition wires during normal operation of an engine. It is also well known that by sampling the electromagnetic emissions, ignition information can be obtained for evaluating the operation of the engine. Prior art devices are either triggered by the electromagnetic emissions or measure the amplitude of the emissions to provide spark information.

Many prior art devices merely sense the level or amplitude of high voltage along the ignition wires. The basic operating theory of these devices is that the coil voltage will only climb as high as required to cause the spark plug to fire. When the plug does fire, coil energy is released, clamping any further voltage rise. As engine speed increases, the corresponding increase in cylinder compression will require more voltage for the spark plug to fire.

Neon type testers use this theory by relating the brightness of the neon tube directly to voltage in the ignition wire. The neon tube will appear brighter with increases in engine speed. Oscilloscopes will visually display on a screen the higher voltage required for the spark plug to fire. Both of these devices translate the signal level amplitude of the ignition wires and correlate the amplitude to the potential for a spark.

In the case of the neon type tester, a certain degree of skill and training is required in order to properly interpret the brightness of the neon light as it relates to the spark condition of the ignition system. For the do-it-yourself mechanic, such device would be generally unsuitable without practice. Further, the brightness of such devices is poor making these devices unsuitable for outdoor use. Oscilloscopes are generally too expensive for the do-it-yourself mechanic.

The prior art devices generally measure or detect only an increase in voltage for a sparking potential of the ignition system. These devices are generally not suited for all conditions of spark. Merely because the ignition system has sufficient voltage to generate a spark does not necessarily mean that a spark will in fact occur.

Other devices attempt to determine whether a spark has occurred by measuring or detecting a current in the ignition wire. If the spark plug is operating or firing in a normal manner, there will be a pulsating current flow through the associated ignition wire. By detecting this current, the device indicates a spark condition.

In normal operation of an engine, these devices will detect a spark. However, this type of device will not properly diagnose a condition where the spark plug is wet. Such condition occurs when the engine is choked during start-up. In this case, the voltage increases, yet current will flow through the conductive fuel mixture thereby indicating a spark condition even though the spark plug has not fired.

SUMMARY OF THE INVENTION

The disadvantages of the prior art may be overcome by providing an ignition tester which detects a spark condition by sampling the electromagnetic emissions generated by the ignition of the engine and decoding the frequency and amplitude of the voltage pulses.

The invention provides a tester which will detect a voltage increase for spark condition and then detect a high frequency burst indicating a spark.

The invention provides a probe which will not distort the high frequency spark burst.

According to one aspect of the invention a spark ignition analyzer is provided comprising, a probe having a first and second pick-up responsive to a voltage from an ignition wire, a high tension detector means for detecting an absolute voltage increase from the first pick-up and triggering a first signal for a predetermined time period, and a spark detector means for detecting a high frequency voltage fluctuation from the second pick-up and triggering a second signal for a predetermined time period. The combination of signals is used to analyze the ignition system of an engine.

According to another aspect of the invention, a spark ignition analyzer is disclosed comprising, a probe having a first and second pick-up responsive to a voltages from an ignition wire of an engine, with the second pick-up sensitive to high frequencies, a high tension detector means for detecting an absolute voltage increase from the first pick-up and after detecting the voltage increase generating a first pulse with a first period, a first signal means responsive to the first pulse and adapted to signal for a predetermined time period, and a spark detector means for detecting a high frequency voltage fluctuation from the second pick-up within a second period immediately after the first period and after detecting the voltage fluctuation generating a second pulse, a second signal means responsive to the second pulse and adapted to signal to the end of the predetermined time period, whereby the combination of signals provides analytical information of the state of operation of the engine.

The high tension detector means includes a polarity detection means for determining the polarity of the voltage increase from the first pick-up and generating a corresponding positive or negative signal adapted to condition the spark detector means to detect a corresponding voltage decrease. The high tension detection means comprises a first transistor means for amplifying a negative voltage and a second transistor means for amplifying a positive voltage. The first transistor means is operably connected to a first RS latch and the second transistor means operably connected to a second RS latch, with the first RS latch adapted to trigger a first timer means to initiate the first time period and to generate the negative signal, and with the second RS latch adapted to trigger the first timer means to initiate the first time period and to generate the positive signal.

The spark detector means comprises a third transistor means for amplifying a negative voltage from the second pick-up and operable after receiving the negative signal, and a fourth transistor means for amplifying a positive voltage from the second pick-up and operable after receiving the positive signal, a second timer means for generating the second period and a lagging edge trigger, the second timer means initiating when the first pulse decreases to a zero voltage and enabling the lagging edge trigger for the second period. The trigger is responsive to a voltage decrease from either the third or fourth transistor means, and if detected, generating the second pulse.

The apparatus may optionally have a polarity identification means for determining the polarity of the ignition system of the engine. The identification means comprises a third RS latch operably connected to a third signal means and adapted to signal upon receiving the negative signal and a fourth RS latch operably connected to a fourth signal means and adapted to signal upon receiving the positive signal.

Still further, the analyzer may include a switch for switching between a spark mode to spark malfunction mode, a fifth RS latch operably connected to the lagging edge trigger and a non-inverted output of the second timer whereby a second pulse is generated if a voltage fluctuation is not detected.

Still further, the analyzer may be operated in combination with a booster lead operably connected between a spark plug and ignition wire of the engine. The lead has a low potential gap for increasing the apparent gap of the spark plug.

Still further, the analyzer may be operated in combination with an electrical probe connected to ground and systematically grounding each spark plug.

BRIEF DESCRIPTION OF THE DRAWINGS

In drawings which illustrate embodiments of the invention.

Figure 1:
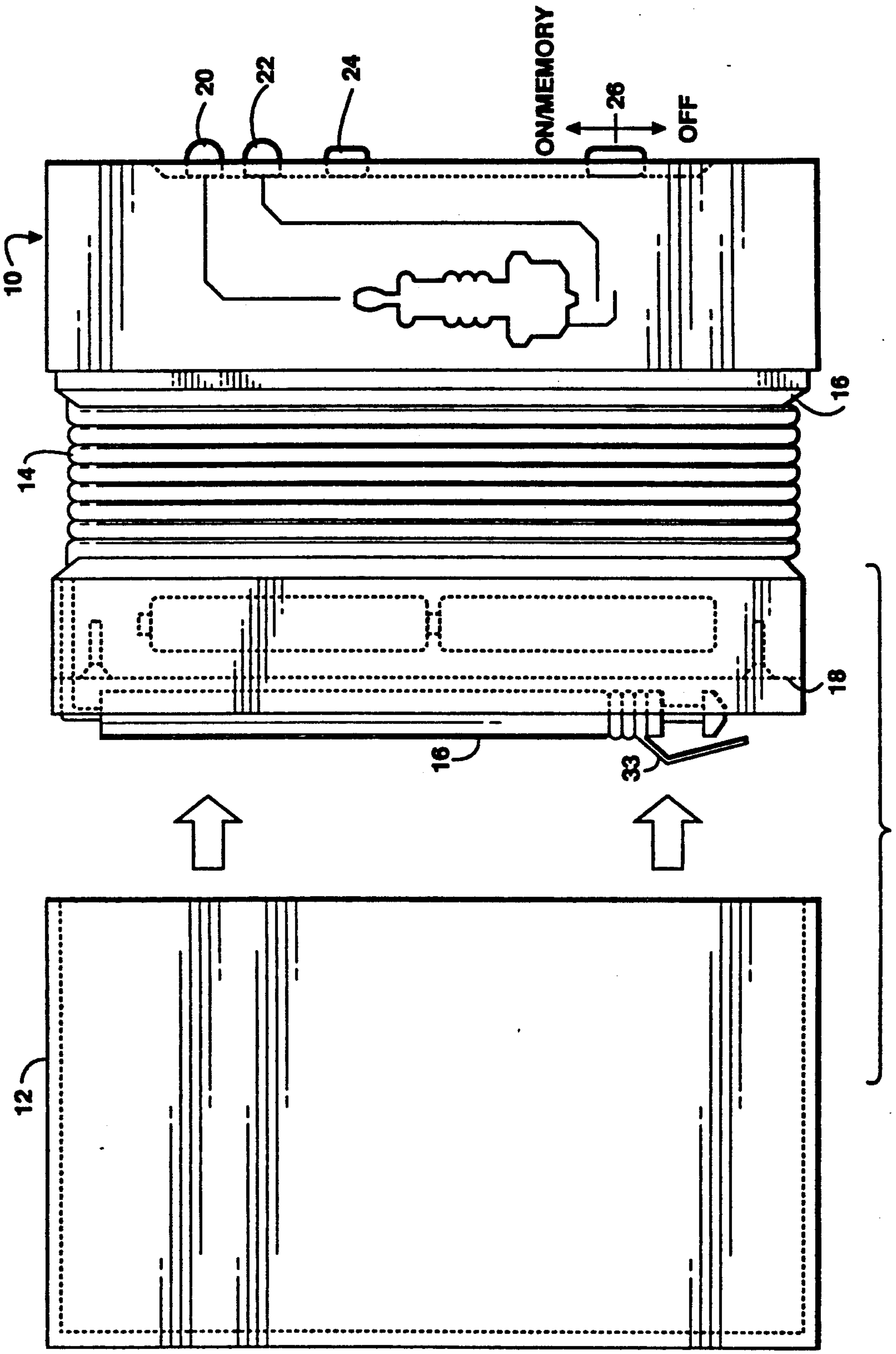
FIG. 1 is a front view of the preferred embodiment.

The invention is generally illustrated as 10 on FIG. 1. The spark ignition analyzer comprises a body 10, a cover 12, a lead 14 connected to the body and a probe 16.

Body 10 is formed from two half shells to encase the circuitry contained therein and joined by suitable means. Body 10 is moulded to present a narrow section 16 for wrapping lead 14 thereabouts for storage thereof. Body 10 has a receptacle 18 in one end for retaining probe 16 for storage. Cover 12 will cover body 10 to enclose probe 16 and lead 14 for storage.

High tension LED 20 and spark LED 22 are mounted on body 10 at an end opposite receptacle 18. Clear memory button 24 is also mounted near LEDs 20 and 22. Function button 26 is mounted adjacent to memory button 24. The body 10 can have markings or other indicia near each component for identification purposes.

Figure 5:
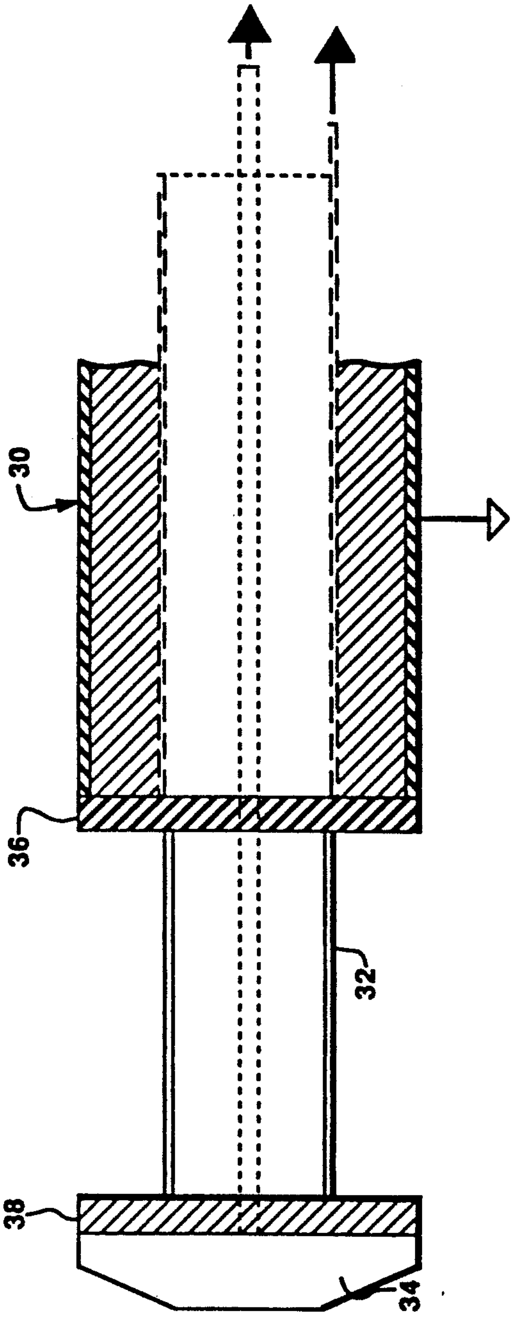
FIG. 5 is a partial sectional view of the probe of the embodiment of FIG. 1.

The probe of the present invention is illustrated in detail in FIG. 5. The probe comprises a body 30 having a high tension pick-up 32. At one end of the high tension pick-up is a solid spark pick-up 34 which has a diameter greater than that of the high tension pick-up 32. Clip 33 is mounted on body 30 and is biased towards body 30 to provide a clamping force therebetween allowing the probe to grip an ignition wire.

The end of body 30 has a fibre washer 36 to insulate the body which is grounded from the pick-ups. Likewise, spark pick-up 34 is provided with a fibre washer 38. Optionally, the entire probe may be coated with an insulating material to reduce the high tension induction onto the tester and to reduce electrostatic induction to the circuitry.

Figure 2:
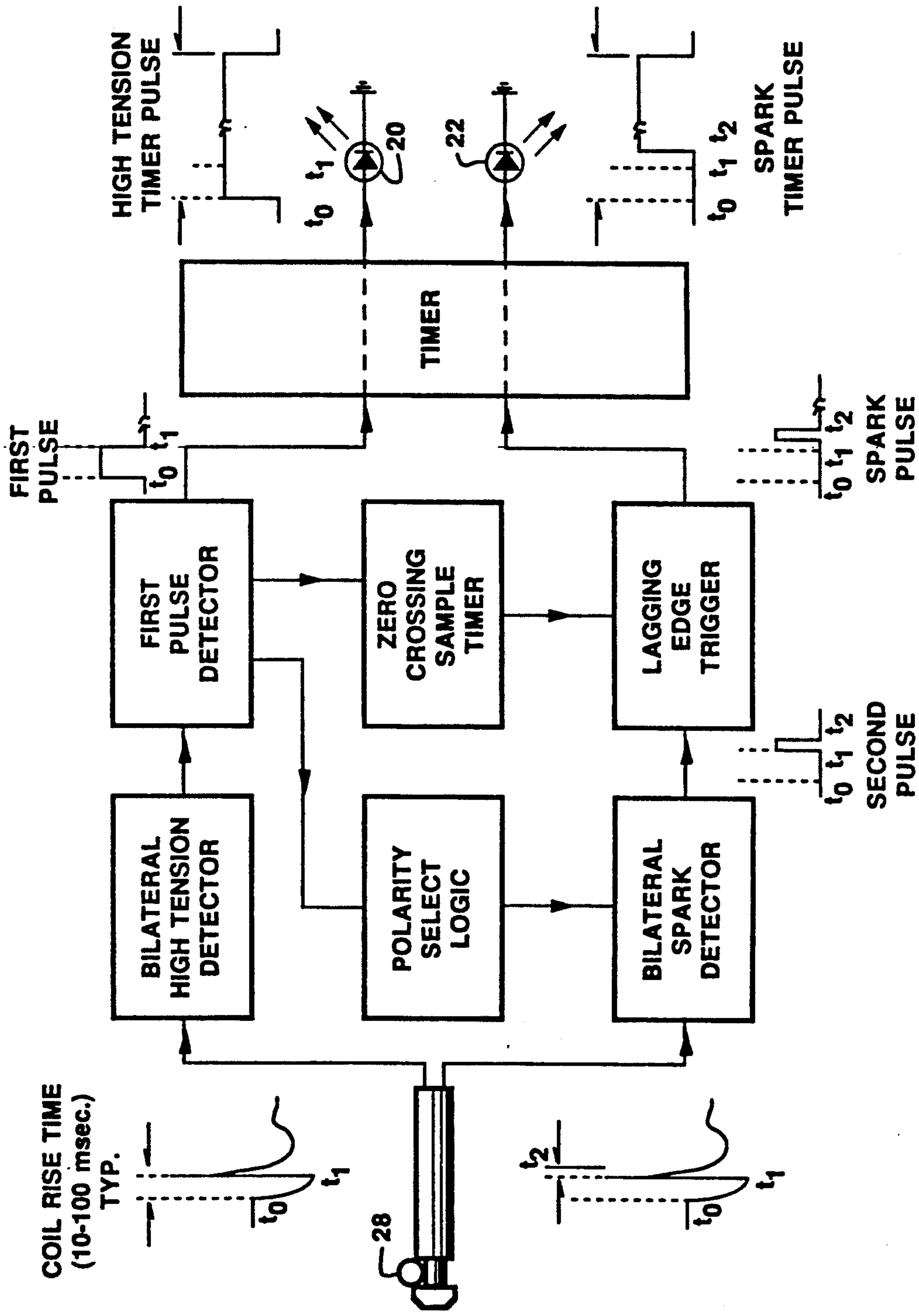
FIG. 2 is a block diagram of the circuit of the preferred embodiment of FIG. 1.

The circumferential surface of high tension pick-up 32 is electrically connected to the High Tension Detector as illustrated in FIG. 2. The spark pick-up 34 is electrically connected to the Spark Detector co-axially through the center of pick-up 32.

High tension pick-up 32 is a conventional inductive coil pick-up, having a secondary winding. A voltage conducted through ignition wire 28 will induce a voltage in the secondary winding of pick-up 32.

Spark pick-up 34 is an inductive coil having a high sensitivity to the high frequencies commonly generated by a spark and a low sensitivity to resonant coil frequencies.

Passive components can be inserted into the probe circuitry to match impedance of the main circuitry, if the probe dimensions are tailored for a specific requirement.

Figure 3:
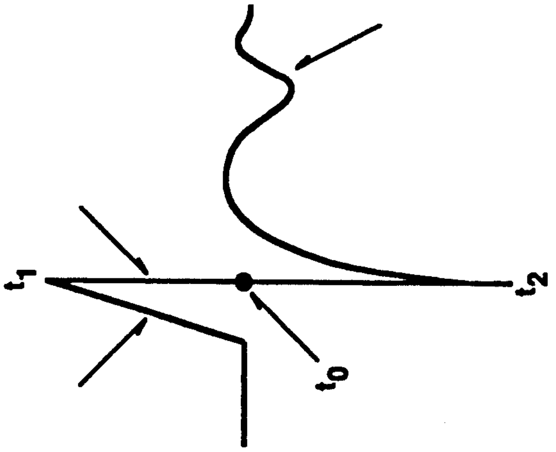
FIG. 3 is an illustration of a simplified waveform of an ignition voltage.

FIG. 3 illustrates a simplified waveform the voltage of a typical ignition spark. When an ignition coil is pulsed at $T_0$, the secondary voltage will rise with respect to the polarity of the system. The spark will not disturb this rise in voltage until the spark potential has been reached. At this point $T_1$, the spark plug undergoes a step change in terminal resistance suddenly presenting a low resistance path to ground. This will cause the energy in the coil secondary to discharge and rapidly collapse the voltage. The energy will jump across the gap causing a spark which ignites the fuel-air mixture. There is an initial voltage increase lasting between 10 to 100 microseconds. This voltage collapses rapidly through zero with a series of high frequency opposite pulses lasting 0.1 to 1 microsecond. A short time period $T_2$ is selected to detect the high frequency burst.

FIG. 2 illustrates the block diagram of the operation of the present invention. Probe 16 is connected to the ignition wire 28. An ignition coil's pulse, secondary voltage passing through ignition wire 28 will rise in a direction, either positive or negative, with the polarity of the system.

With reference to FIG. 2, the first stage of the circuitry generally comprises a Bilateral High Tension Detector which detects the initial voltage increase or first pulse and a Bilateral Spark Detector which has a high sensitivity to the spark frequencies and a low sensitivity to resonant coil frequencies.

Detection of the first pulse by the Bilateral High Tension Detector will enable the First Pulse Detector to trigger a timer to drive the high tension LED 20 for a period of time. The Bilateral High Tension Detector will pass the first pulse but will not be affected by the subsequent pulses while the timer is enabled.

The First Pulse Detector will identify the polarity of the first pulse as being either positive or negative. A signal is generated from the First Pulse Detector to the Polarity Select Logic which will then send a signal to the Bilateral Spark Detector whereby the Spark Detector polarity will be opposite of the polarity of the first pulse.

At $T_1$, the first pulse is collapsing causing the voltage to pass through zero voltage and trigger the Zero Crossing Sample Timer. The Zero Crossing Sample Timer will enable the operation of the Lagging Edge Trigger for a short time period $T_2$ of approximately two microseconds. The Lagging Edge Trigger will detect the falling or lagging edge of the second pulse. The second pulse must occur within the Zero Crossing Sample Timer period and be short enough to collapse within this time reference. In other words, the combination of the Zero Crossing Sample Timer and Lagging Edge Trigger measures the time period of the second pulse. The presence of a Lagging Edge Trigger pulse will determine if the spark has been fired. If detected, a signal will be generated to illuminate the spark LED 22 the remainder of the timer period.

Figure 4:
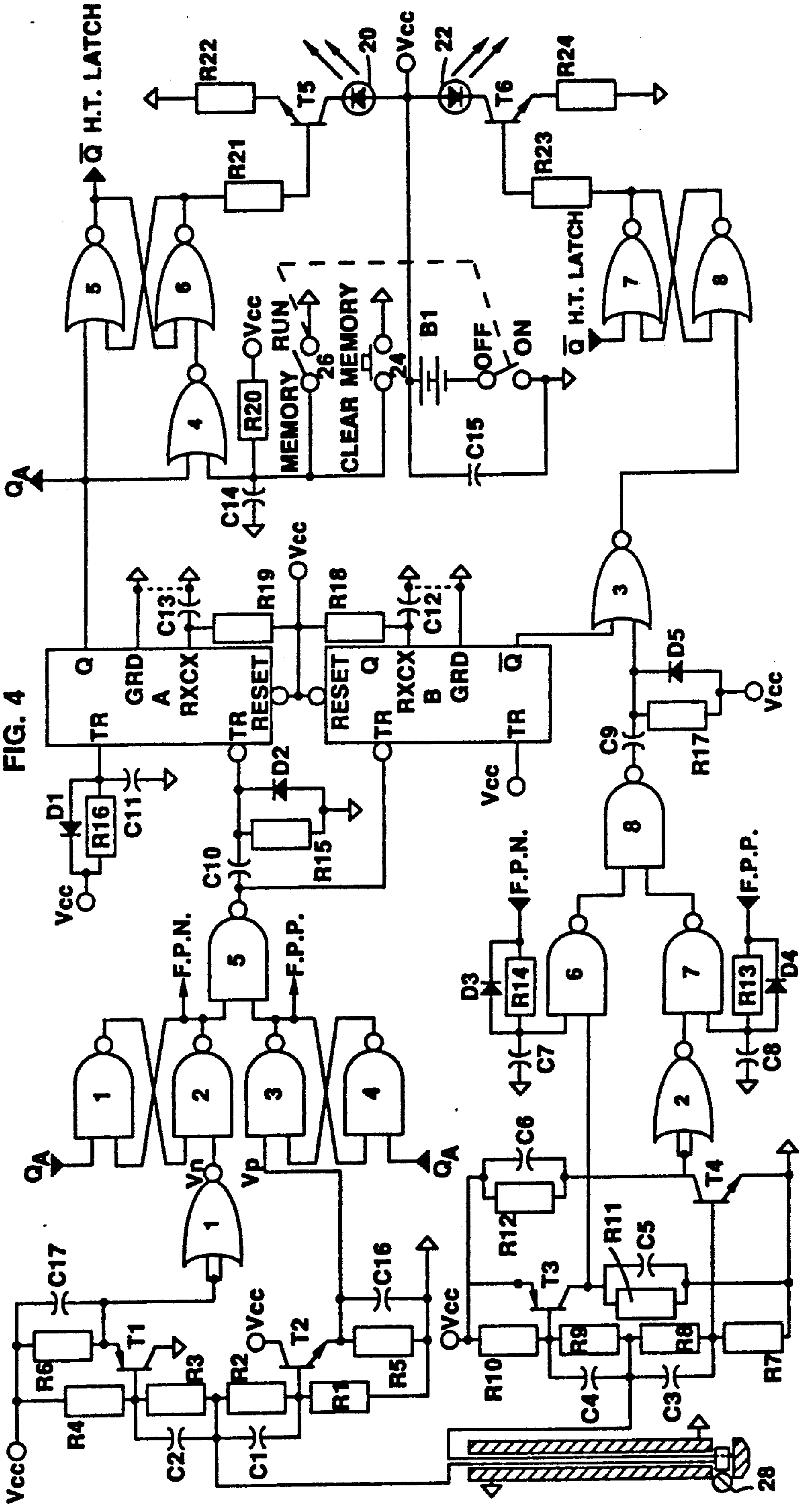
FIG. 4 is a detailed circuit diagram of the preferred embodiment of FIG. 1.

With reference to FIG. 4, a detailed circuit diagram is illustrated. T1 is the negative High Tension Detector and T2 is the positive High Tension Detector. The voltage from the probe is fed into the Bilateral High Tension Detector. The output of the negative detector is fed into NOR 1 which is the signal inverter to standardize the voltage for the next portion of the circuit. NOR 1 generates an output $V_n$.

$V_n$ is fed into the First Pulse Detector. NAND 1 and NAND 2 are arranged as an RS latch. $V_n$ is inputted into the set of this latch, the NAND 2 input. The output of the first pulse latch is used to trigger monostable timer A which in turn activates the reset of the latch through NAND 1 input. By enabling the reset after the trigger pulse, the toggle of the initial $V_n$ thereby terminates further pulses for the remainder of the monostable timer A period. The output of NAND 2 will exhibit the first pulse negative signal (F.P.N.).

NAND 3 and NAND 4 are likewise arranged as an RS latch. The $V_p$ is input to the set of the latch. NAND 3 and NAND 4 will act in the manner identical to NAND 1 and NAND 2 except that the output of NAND 3 will be the first pulse positive signal (F.P.P.). The output of the first pulse latch either F.P.N. or F.P.P. is supplied to NAND 5 to supply a common trigger pulse to monostable timer A. The output of NAND 5 is also supplied to the monostable trigger B.

As an added feature, a second trigger is provided (C11, R16 and D1) which will cause the high tension LED 22 to flash when the tester is turned on.

Monostable timer A will supply a single pulse to drive the high tension LED circuitry. The monostable timer in the present embodiment is set to approximately 4.0 milliseconds by selecting the value R19 and C13.

The time period for the pulse is a selection between the LED effective intensity and the pulse width saturation. At 4.0 milliseconds, the monostable timer A will meet approximately 15,000 pulses per minute which many engines will not exceed this value.

The high tension latch, NOR 5 and NOR 6 is arranged as an RS latch. The output of NOR 6 drives the high tension transistor T5 and the output of NOR 5 controls the reset input to the spark latch.

NOR 4 will provide the monostable pulse to the reset of the high tension latch. The output of NOR 4 normally is a complimentary monostable pulse which continually resets the high tension latch of the High Tension Detector during the monostable timer off periods.

The high tension driver, T5 acts a sink to the high tension LED. R22 limits the current to the LED to less than 20 milliamps.

T3 is the negative spark detector and T4 is the positive detector of the Bilateral Spark Detector. The output of T4 is fed into NOR 2 to standardize the voltage for the next portion of the circuit.

NAND 6 and NAND 7 form the polarity logic circuit to the Bilateral Spark Detector. NAND 6 and NAND 7 are always active and are used as a protective measure to insure accurate spark detection when testing distributor type systems during a wet plug condition when there is conductive fouling at the gap of the spark plug.

In a distributor type system, the coil energy is discharged suddenly with a step change of the rotor gap of the distributor. The step change causes the spark to produce a high amplitude, same polarity voltage spike which usually occurs very close to the zero crossing of the first pulse. NAND 6 and NAND 7 will allow the spike to pass only when the spike occurs very shortly after the zero crossing of the first pulse and is the same polarity as the first pulse. The Pulse Width Detector is able to detect this spark spike as a result.

The F.P.N. signal is applied to the F.P.N. delay circuit comprising C7, R14 and D3. The F.P.N. signal will go low and block any signal from T3. The combination of C7 and R14 will hold the NAND 6 low beyond the sampling time of the second pulse.

Equally, the F.P.P. delay circuit comprising C8, R13 and D4 has the same values as F.P.N. delay circuit and operates in the same manner. The output of either NAND 6 or NAND 7 is inputted into NAND 8 which accepts either signal to indicate and provide a common spark pulse.

The Lagging Edge Trigger circuit comprising C9, R17 and D5 is a passive differentiator to supply a negative trigger pulse to the next gate at the falling or lagging edge of the common spark signal, the output of NAND 8.

The monostable spark timer B, is triggered at the zero crossing of the first pulse. Monostable timer B is set to approximately 2 microseconds and provides the sampling time for the second pulse.

Spark gate NOR 3 supplies a set of pulse to the spark latch provided that the lagging edge of the second pulse falls within the sampling time of the spark monostable timer B.

The spark latch, NOR 7 and NOR 8 is also arranged as an RS latch. The output of NOR 7 drives the spark transistor T6.

Voltage to the circuit is provided by batteries B1 which are connected in series with a function switch.

The values of the components are as follows:

| Component | Value | Component | Value |
|---|---|---|---|
| R1 | 220 k | C1 | 0.01 micro |
| R2 | 470 k | C2 | 0.01 micro |
| R3 | 470 k | C3 | 0.001 micro |
| R4 | 220 k | C4 | 0.001 micro |
| R5 | 1 k | C5 | 0.001 micro |
| R6 | 1 k | C6 | 0.001 micro |
| R7 | 1 k | C7 | 0.001 micro |
| R8 | 10 k | C8 | 0.001 micro |
| R9 | 10 k | C9 | 0.001 micro |
| R10 | 1 k | C10 | 0.001 micro |
| R11 | 100 | C11 | 0.01 micro |
| R12 | 100 | C12 | 100 pico |
| R13 | 10 k | C13 | 0.01 micro |
| R14 | 10 k | C14 | 0.01 micro |
| R15 | 1 k | C15 | 10.000 micro |
| R16 | 10 k | C16 | 10 pico |
| R17 | 1 k | C17 | 10 pico |
| R18 | 10 k | | |
| R19 | 470 k | | |
| R20 | 10 k | | |
| R21 | 10 k | D1 | Signal |
| R22 | 27 | D2 | Signal |
| R23 | 10 k | D3 | Signal |
| R24 | 27 | D4 | Signal |
| | | D5 | Signal (1N914 or equiv.) |
| T1 | 2N2907 or equiv. | NOR | MC74HC02AN |
| T2 | 2N2222 or equiv. | NAND | MC74HC00AN |
| T3 | 2N2907 or equiv. | TIMER | MC74HC4234AN (or equiv.) |
| T4 | 2N2222 or equiv. | | |
| T5 | 2N2222 or equiv. | | |
| T6 | 2N2222 or equiv. | | |

Optionally, bypass capacitors of approximately 0.001 micro may be added to most of the CMOS inputs to shield the circuitry from stray electromagnetic emissions.

In operation, the combination of LED 20 and 22 flashing will indicate the spark condition which can be used to diagnose the problem in the ignition system. The possible combination for the LEDS are as follows:

| HIGH TENSION | SPARK | COMMENT |
|---|---|---|
| Not Flashing | Not Flashing | no high tension voltage |
| Flashing | Not Flashing | high tension voltage, but no spark |
| Flashing | Flashing | spark plug firing normally |
| Intermittent Flashing | Not Flashing | intermittent high tension voltage, no spark |
| Flashing | Intermittent Flashing | intermittent spark |
| Intermittent Flashing | Intermittent Flashing | intermittent high tension voltage causing intermittent spark |

As illustrated in FIG. 2, the invention is provided with a memory mode. The memory will cause the LEDS to remain steady until the Clear Memory button is pushed. This will permit a single operator to install the probe onto an ignition wire and then crank the ignition from the driver's seat. After turning the engine over, the operator can then go to the device and see the response obtained. This eliminates the need for a second person to be present to either turn the ignition or watch the response of the device.

The diagnostic results can be further simplified by providing a chart on the body of the device to indicate the possible results. The basic trouble-shooting chart would be as follows:

| High Tension | Spark | Result |
|---|---|---|
| 0 | 0 | total ignition failure<br>reset button<br>ignition switch<br>connections |
| 1 | 0 | wet or fouled plug<br>lay off the choke/hold choke open |
| 1 | 1 | ignition system normal/lack of fuel<br>keep choke on until engine starts |

The basic model of a spark ignition analyzer has been described in detail. However, it is apparent that other optional features can be added to enhance the capabilities of the analyzer.

Figure 6:
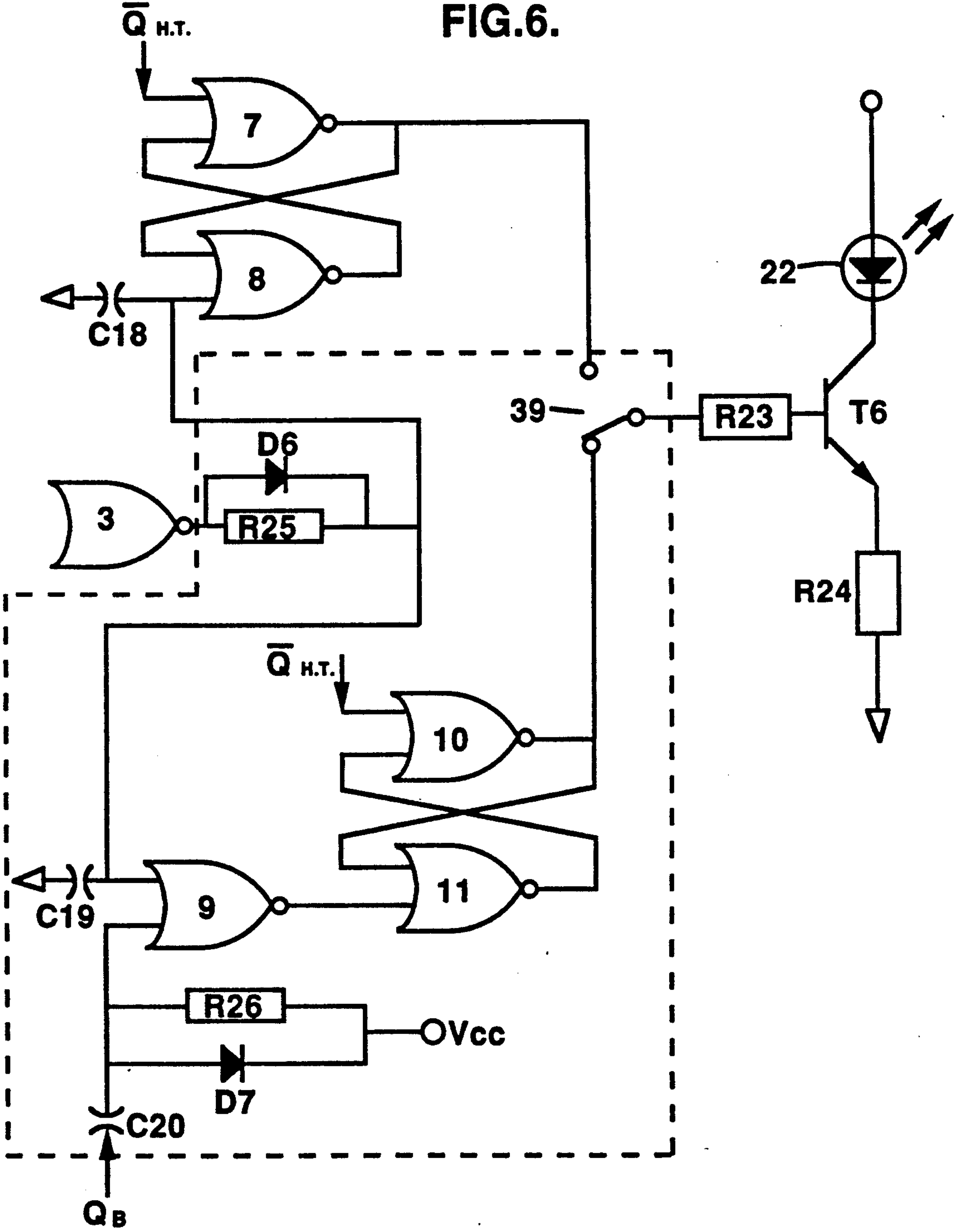
FIG. 6 is a detailed circuit diagram of a Spark Malfunction mode.

With reference to FIG. 6, a spark malfunction mode can be added to the circuit. Switch 39 is inserted between R23 and NOR 7 to switch between a spark mode and a spark malfunction mode. The spark malfunction mode is used to observe intermittent spark misses. Rather than trying to observe a missed flash of the spark LED 22, LED 22 is caused to flash if a spark is missed in the spark malfunction mode.

Between switch 39 and NOR 3, the spark malfunction mode is inserted, as illustrated in FIG. 6. NOR 10 and NOR 11 form a spark malfunction latch. The input of NOR 10 is a reset which allows the circuit to have a memory mode. The values of components of the malfunction mode are as follows:

| Component | Value | Component | Value |
|---|---|---|---|
| R25 | 10 k | C18 | 0.001 micro |
| R26 | 2.2 k | C19 | 0.001 micro |
| | | C20 | 0.001 micro |
| D6 | Signal (1N914 or equiv.) | | |
| D7 | Signal (1N914 or equiv.) | | |
| NOR 9/10/11 | MC74HC02AN | | |

NOR 9 provides the spark malfunction pulse. NOR 3 produces a spark set pulse in the manner described above. NOR 9 will not produce a pulse should a spark pulse be present. QB is the non-inverting output of the Zero Crossing Sample Timer (monostable timer B) which fed to one input of NOR 9. QB is conditioned by a passive differentiator (C20/R26/D7) which enables the operation of NOR 9 at the end of QB and for only a short time period. A spark pulse should have been received by NOR 9 during such period of time. If one is not received a spark malfunction pulse is generated causing spark LED 22 to flash.

The spark pulse is never longer than the period of time of QB. The spark pulse must be extended to overlap with the delayed sample time of QB. C18/C19/R25/D6 achieve the desired overlap effect.

Figure 7:
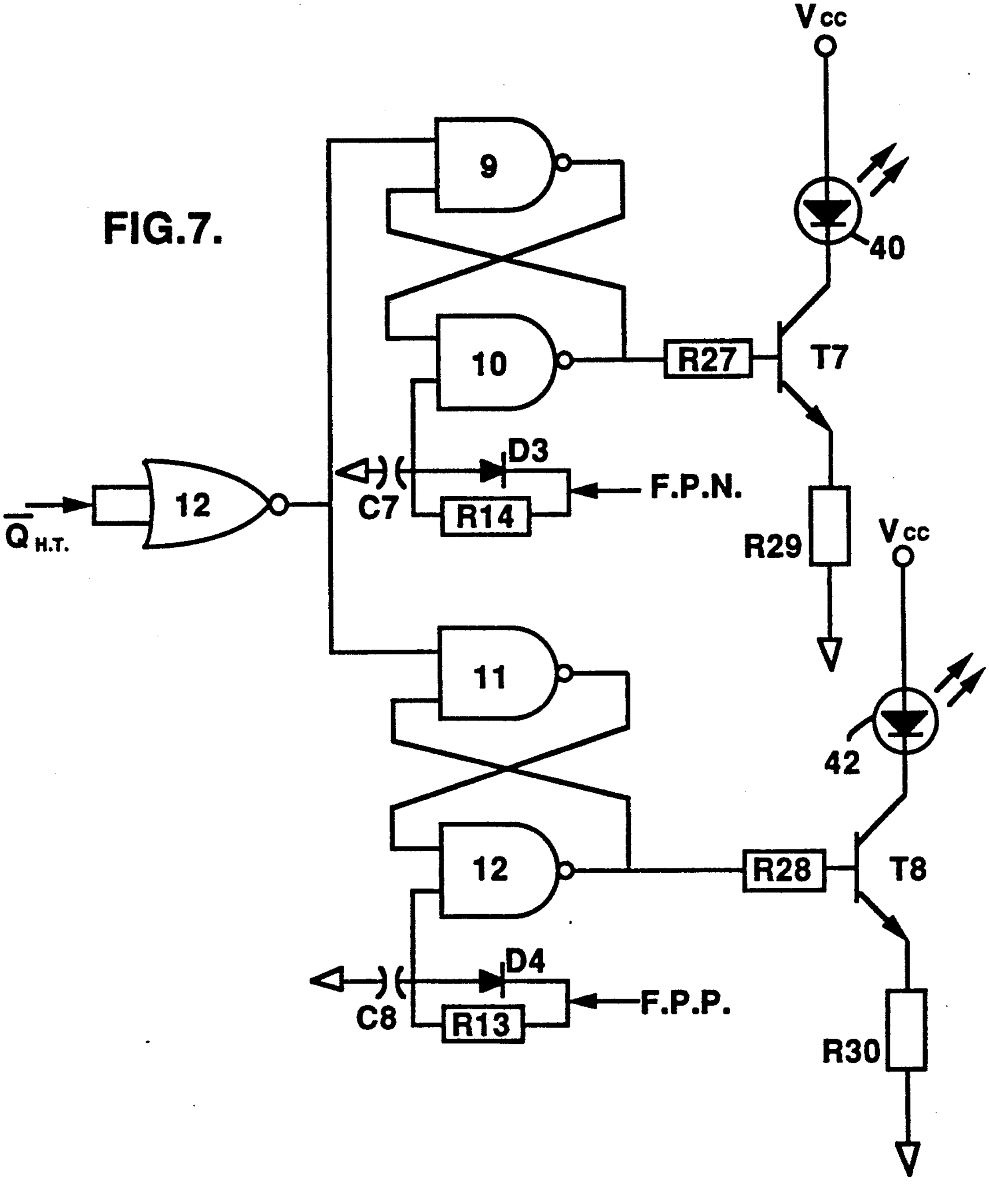
FIG. 7 is a detailed circuit diagram a coil polarity with memory mode.

A coil polarity circuit could also be included. Such a coil polarity circuit is illustrated in FIG. 7. LED 40 indicates a negative coil and LED 42 indicates a positive coil. This circuit is useful to ensure that the primary coil connections have been properly wired to produce maximum output voltage. The values of components of the coil polarity circuit are as follows:

| Component | Value | Component | Value |
|---|---|---|---|
| R27 | 10 k | T7 | 2N2222 or equiv. |
| R28 | 10 k | T8 | 2N2222 or equiv. |
| NOR 12 | MC74HC02AN | | |

The High Tension pulse is fed into the input of NOR 12. The output of NOR 12 is fed to both reset inputs of the polarity latches. NAND 9 and NAND 10 form the negative polarity latch and NAND 11 and NAND 12 form the positive polarity latch. A set pulse from the F.P.N will trigger the negative latch and a set pulse from the F.P.P. will trigger the positive latch.

Figure 8:
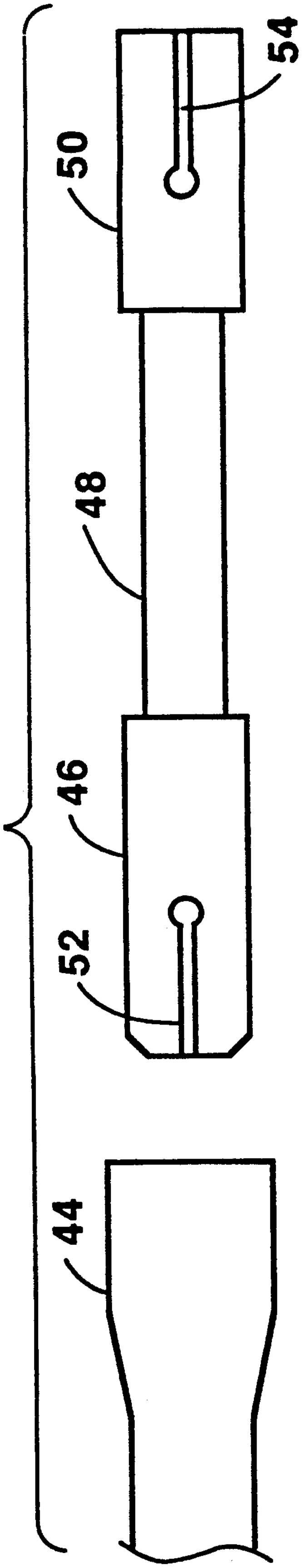
FIG. 8 is an illustration of a booster lead.

The spark analyzer of the present invention could also be used with a booster lead as illustrated in FIG. 8. The lead is a length of ignition wire 48 having a male receptacle 46 at one end and a female receptacle 50 at the opposite end. Receptacle 46 is provided with a slot 52 to allow compression of the end to be inserted into the boot end of a standard ignition wire 44. Similarly, receptacle 50 has a slot 54 to permit expansion of the end to fit over the end of a spark plug. Receptacle 50 is not provided with an insulation cover allowing electrical contact with the spark plug.

As is apparent, the booster lead is installed onto an engine by removing the ignition wire 44 from the spark plug and connecting the booster lead in series with the ignition wire and the spark plug.

The booster lead has a low potential gap adding a gap to the existing spark plug. Greater voltage will be required for the voltage to bridge both gaps. If a no spark or an intermittent spark condition persists when testing with the booster lead, then there is a high tension problem in the engine. If the spark condition improves, then the spark plug is fouled.

Figure 9:
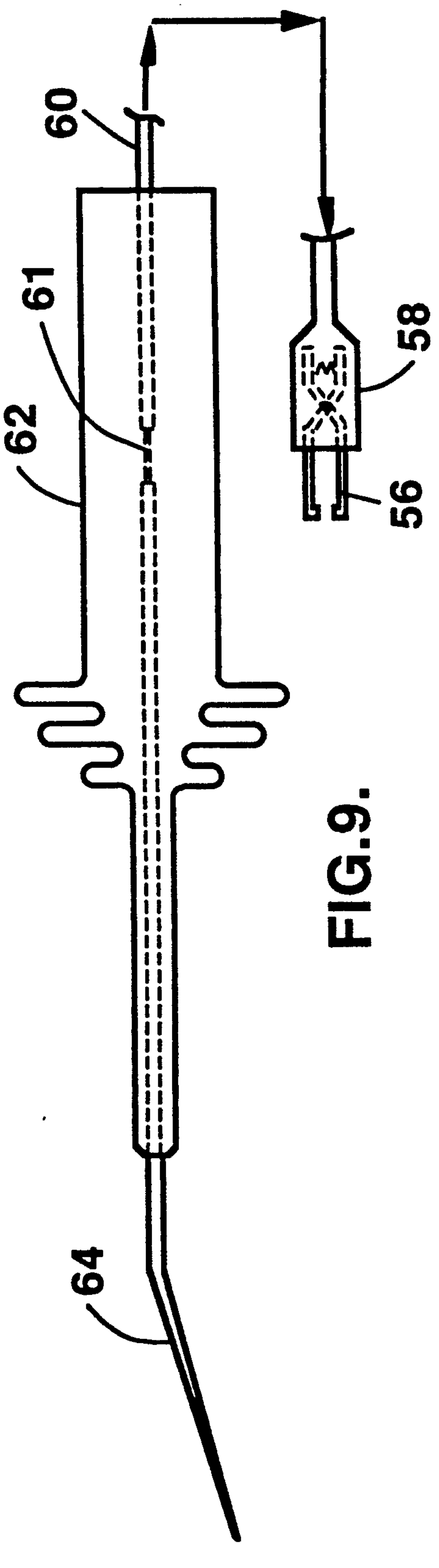
FIG. 9 is an illustration of short circuit stick.

The spark analyzer of the present invention could still further be used with a short circuit stick as illustrated in FIG. 9. At one end of the stick is an alligator clamp 56, electrically connected to a lead 60, electrically connected to a probe 64. The handle 62 insulates the user from electrical contact.

In use, the stick is clamped to a suitable ground. The user successively shorts out each spark plug while monitoring the degree of change in engine speed. By shorting out each spark plug, weak cylinders can be identified by comparing the absence of the cylinder with the absence of other cylinders, since a weak cylinder will not affect the engine speed as significantly as a properly firing cylinder. If booster leads as illustrated in FIG. 8 are installed on the engine, shorting the spark plug can be accomplished quite easily since the receptacle 50 is open for electrical contact to short out the spark plug.

It is apparent to one skilled in the art that the invention could also be used to diagnose most other ignition problems such as point dwell, coil power, high resistance connections, leaky wires or distributor carbon tracking.

It will be obvious to those skilled in the art that various modifications and changes can be made to the device without departing from the spirit and scope of this invention. Accordingly, all such modifications and changes as fall within the scope of the appended claims are intended to be part of this invention.

We claim:

1. A spark ignition analyzer comprising, a probe having a first and second pick-up responsive to a voltages from an ignition wire of an engine, said second pick-up sensitive to high frequencies, a high tension detector means for detecting an absolute voltage increase and a zero voltage from the first pick-up and after detecting the voltage increase generating a first pulse with a first period, a first signal means responsive to the first pulse and adapted to signal for a predetermined time period, and a spark detector means for detecting a high frequency voltage fluctuation from the second pick-up within a second period and after detecting the voltage fluctuation generating a second pulse, the second period initiating when the high tension detector means detects the zero voltage, the second period being shorter in duration than the first period, a second signal means responsive to said second pulse and adapted to signal to the end of the predetermined time period, whereby the combination of signals provides analytical information of the state of operation of the engine.

2. A spark ignition analyzer comprising, a probe having a first and second pick-up responsive to a voltages from an ignition wire of an engine, said second pick-up sensitive to high frequencies, a high tension detector means for detecting an absolute voltage increase and a zero voltage from the first pick-up and after detecting the voltage increase generating a first pulse with a first period, said high tension detector means includes a polarity detection means for determining the polarity of the voltage increase from said first pick-up and generating a corresponding positive or negative signal adapted to condition the spark detector means to detect a corresponding voltage decrease, a first signal means responsive to the first pulse and adapted to signal for a predetermined time period, and a spark detector means for detecting a high frequency voltage fluctuation from the second pick-up within a second period and after detection the voltage fluctuation generating a second pulse, the second period initiating when the high tension detector means detects a zero voltage, the second period being shorter in duration than the first period, a second signal means responsive to said second pulse and adapted to signal to the end of the predetermined time period, whereby the combination of signals provides analytical information of the state of operation of the engine.

3. An analyzer as claimed in claim 2 wherein said high tension detection means comprises a first transistor means for amplifying a negative voltage and a second transistor means for amplifying a positive voltage, said first transistor means operably connected to a first RS latch and said second transistor means operably connected to a second RS latch, said first RS latch adapted to trigger a first timer means to initiate said first time period and to generate said negative signal, said second RS latch adapted to trigger said first timer means to initiate said first time period and to generate said positive signal.

4. An analyzer as claimed in claim 3 wherein said spark detector means comprises a third transistor means for amplifying a negative voltage from said second pick-up and operable after receiving said negative signal, and a fourth transistor means for amplifying a positive voltage from said second pick-up and operable after receiving said positive signal, a second timer means for generating said second period, and a lagging edge trigger, said second timer means initiating when said first pulse decreases to a zero voltage and enabling said lagging edge trigger for said second period, said trigger responsive to a voltage decrease from either said third or fourth transistor means, and if detected, generating said second pulse.

5. An analyzer as claimed in claim 4 wherein a reset signal said first timer means is a feedback to said first RS latch to disable said high tension detector means during the remainder of said first period.

6. An analyzer as claimed in claim 5 wherein a first pulse is generated when the apparatus is turned on to signal that the analyzer is operational.

7. An analyzer as claimed in claim 6 wherein said first and second signals are adapted to repeat until reset.

8. An analyzer as claimed in claim 7 wherein said analyzer further includes a polarity identification means for determining the polarity of the ignition system of the engine, said identification means comprising a third RS latch operably connected to a third signal means and adapted to signal upon receiving said negative signal and a fourth RS latch operably connected to a fourth signal means and adapted to signal upon receiving said positive signal.

9. An analyzer as claimed in claim 7 wherein said analyzer further includes a switch for switching between a spark mode to spark malfunction mode, a fifth RS latch operably connected to said lagging edge trigger and a noninverted output of said second timer whereby a second pulse is generated if a voltage fluctuation is not detected.

10. An analyzer as claimed in claim 7 wherein said analyzer is operated in combination with a booster lead operably connected between a spark plug and ignition wire of the engine, said lead having a low potential gap for increasing the apparent gap of the spark plug.

11. An analyzer as claimed in claim 7 wherein said analyzer is operated in combination with an electrical probe connected to ground and systematically grounding each spark plug.

12. An analyzer as claimed in claim 7 wherein said first period is in the order of 4 milliseconds and the second period is in the order of 2 microseconds.

* * * * *